(12) United States Patent
Lee et al.

(10) Patent No.: US 10,296,452 B2
(45) Date of Patent: May 21, 2019

(54) DATA SEPARATION BY DELAYING HOT BLOCK GARBAGE COLLECTION

(71) Applicant: SK hynix Inc., Gyeonggi-do OT (KR)

(72) Inventors: Frederick K. H. Lee, Mountain View, CA (US); Xiangyu Tang, San Jose, CA (US); Lingqi Zeng, San Jose, CA (US); Yunhsiang Hsueh, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/152,352

(22) Filed: May 11, 2016

(65) Prior Publication Data

US 2016/0335179 A1 Nov. 17, 2016

Related U.S. Application Data

(60) Provisional application No. 62/159,714, filed on May 11, 2015.

(51) Int. Cl.
*G06F 12/02* (2006.01)
*G06F 3/06* (2006.01)

(52) U.S. Cl.
CPC .......... *G06F 12/0246* (2013.01); *G06F 3/061* (2013.01); *G06F 3/064* (2013.01); *G06F 3/0605* (2013.01); *G06F 3/0616* (2013.01); *G06F 3/0652* (2013.01); *G06F 3/0679* (2013.01); *G06F 2212/214* (2013.01); *G06F 2212/7205* (2013.01)

(58) Field of Classification Search
CPC ............................... G06F 3/06; G06F 12/0246

USPC .......................................... 711/170
See application file for complete search history.

(56) References Cited

U.S. PATENT DOCUMENTS

| | | | |
|---|---|---|---|
| 8,711,627 B2 | 4/2014 | Chiao | |
| 8,799,561 B2* | 8/2014 | Bux | G06F 12/0246 365/185.33 |
| 9,141,526 B2* | 9/2015 | Iliadis | G06F 12/0246 |
| 9,158,670 B1* | 10/2015 | Kang | G06F 12/0246 |
| 9,672,075 B2* | 6/2017 | Wang | G06F 9/45558 |
| 9,959,060 B1 | 5/2018 | Tang et al. | |
| 9,996,297 B2* | 6/2018 | Zhang | G06F 3/0608 |
| 10,049,039 B2* | 8/2018 | Byun | G06F 12/0246 |
| 2010/0169588 A1* | 7/2010 | Sinclair | G06F 12/0246 711/160 |
| 2014/0032817 A1* | 1/2014 | Bux | G06F 12/0246 711/103 |
| 2014/0032851 A1* | 1/2014 | Lightstone | G06F 12/0891 711/135 |
| 2014/0032852 A1* | 1/2014 | Lightstone | G06F 12/0891 711/135 |
| 2016/0092122 A1* | 3/2016 | Agrawal | G06F 3/0616 711/103 |
| 2016/0117256 A1* | 4/2016 | Dor | G06F 12/1009 711/103 |
| 2016/0124848 A1 | 5/2016 | Bellorado et al. | |

(Continued)

*Primary Examiner* — Pierre Miche Bataille
(74) *Attorney, Agent, or Firm* — IP & T Group LLP

(57) ABSTRACT

Memory systems may include a memory including a plurality of blocks, and a controller suitable for determining a pool of blocks from the plurality of blocks as garbage collection (GC) victim block candidates based on a number of valid pages left in each of the plurality of blocks, and selecting a block from the pool of blocks having a minimum number of valid pages as a victim block for garbage collection.

19 Claims, 9 Drawing Sheets

(56) References Cited

U.S. PATENT DOCUMENTS

| | | | |
|---|---|---|---|
| 2016/0179422 A1* | 6/2016 | Lee | G06F 11/10 711/103 |
| 2016/0253257 A1* | 9/2016 | Kim | G06F 12/0253 711/166 |

* cited by examiner

50

70

80

90

DATA SEPARATION BY DELAYING HOT BLOCK GARBAGE COLLECTION

CROSS-REFERENCE TO RELATED APPLICATIONS

This application claims the benefit of U.S. Provisional Application No. 62/159,714 filed May 11, 2015, the entire contents of which are incorporated herein by reference.

BACKGROUND

1. Field

Exemplary embodiments of the present disclosure relate to a memory system and an operating method thereof.

2. Description of the Related Art

The computer environment paradigm has shifted to ubiquitous computing systems that can be used anytime and anywhere. Due to this fact, the use of portable electronic devices such as mobile phones, digital cameras, and notebook computers has rapidly increased. These portable electronic devices generally use a memory system having memory devices, that is, a data storage device. The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

Performance and longevity are important to the industry for data storage devices, such as NAND flash memory and other flash memory devices. There is a need for improved systems that increase performance and longevity of these products.

SUMMARY

Aspects of the invention include memory systems. The memory systems may include a memory including a plurality of blocks, and a controller suitable for determining a pool of blocks from the plurality of blocks as garbage collection (GC) victim block candidates based on a number of valid pages left in each of the plurality of blocks, and selecting a block from the pool of blocks having a minimum number of valid pages as a victim block for garbage collection Further aspects of the invention include methods. The methods may include determining, with a controller, a pool of blocks from a plurality of blocks of a memory as garbage collection (GC) victim block candidates based on a number of valid pages left in each of the plurality of blocks, and selecting, with the controller, a block from the pool of blocks having a minimum number of valid pages as a victim block for garbage collection.

Additional aspects of the invention include memory devices. The memory devices may include a plurality of blocks, a pool of blocks from the plurality of blocks determined as garbage collection victim block candidates based on a number of valid pages left in each of the plurality of blocks, and a victim block selected as a block from the pool of blocks having a minimum number of valid pages.

DETAILED DESCRIPTION

Figure 1:
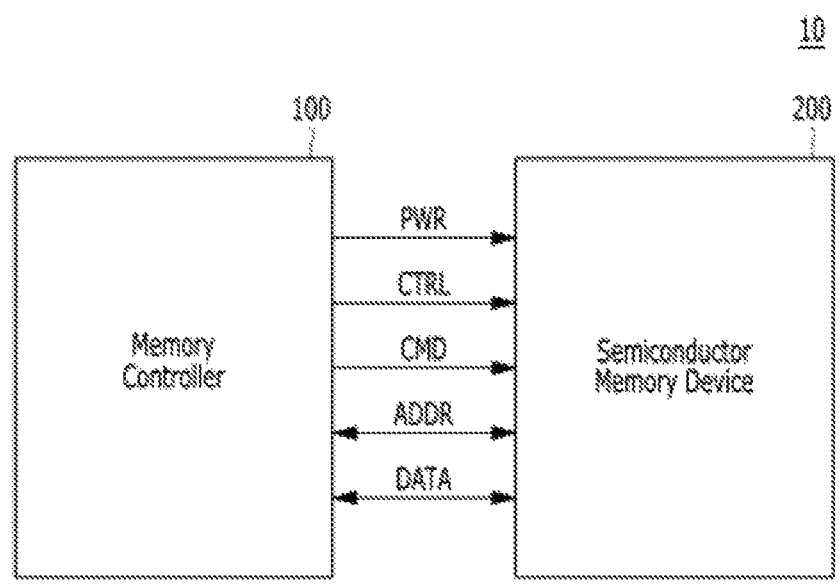
FIG. 1 is a block diagram schematically illustrating a memory system in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

FIG. 1 is a block diagram schematically illustrating a memory system 10 in accordance with an embodiment of the present invention.

Referring FIG. 1, the memory system 10 may include a memory controller 100 and a semiconductor memory device 200.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal may include a command latch enable (CLE) signal, an address latch enable (ALE) signal, a chip enable (CE) signal, a write enable (WE) signal, a read enable (RE) signal, and so on.

The memory controller 100 and the semiconductor memory device 200 may be integrated in a single semiconductor device. For example, the memory controller 100 and the semiconductor memory device 200 may be integrated in a single semiconductor device such as a solid state drive (SSD). The solid state drive may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be integrated in a single semiconductor device to configure a memory card such as a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and a universal flash storage (UFS).

For another example, the memory system 10 may be provided as one of various elements including an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, one of electronic devices of a home network, one of electronic devices of a computer network, one of electronic devices of a telematics network, a radio-frequency identification (RFID) device, or elements devices of a computing system.

Figure 2:
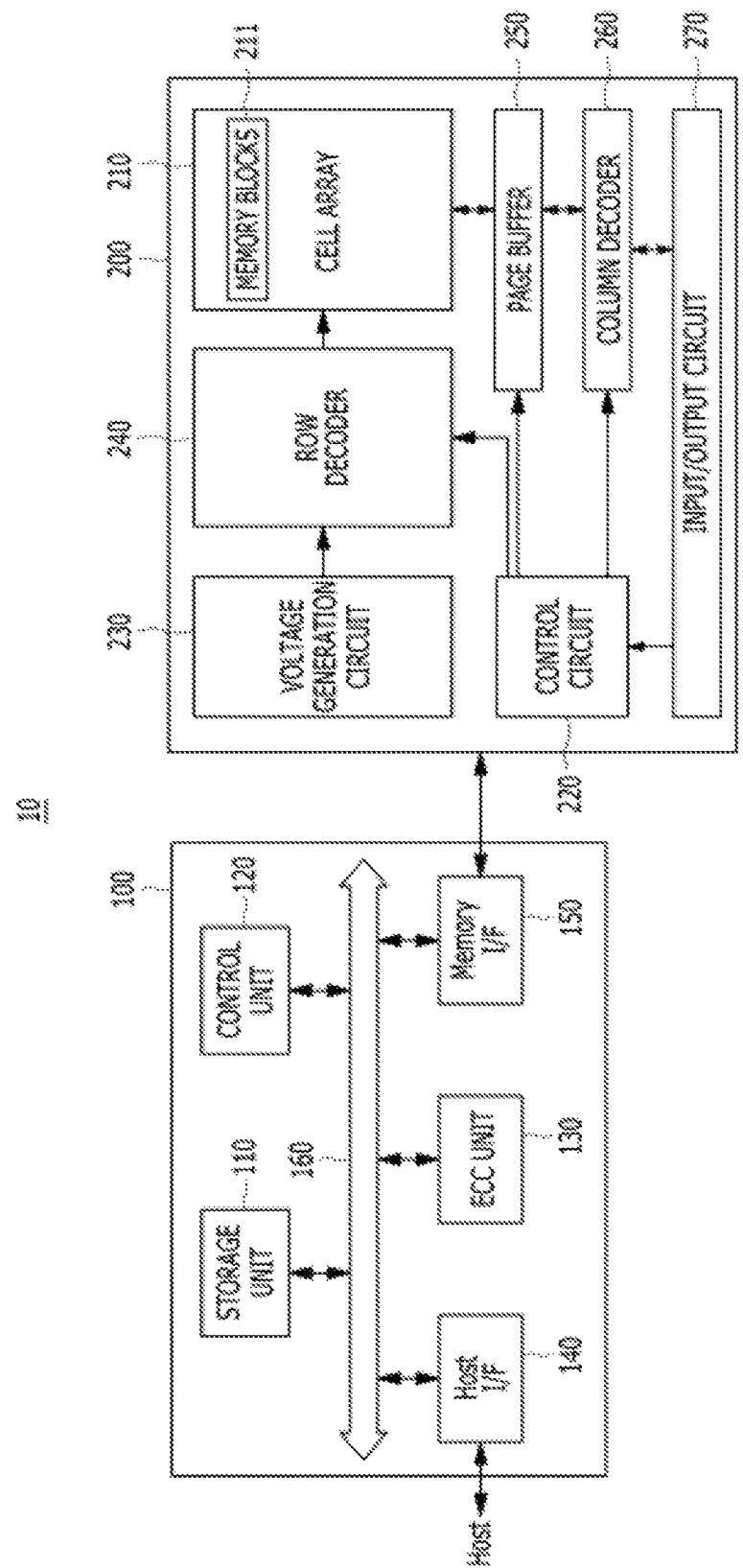
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, a digital video recorder and a digital video player. In some embodiments, the host device may include a portable electronic device such as a mobile phone, a smart phone, an e-book, an MP3 player, a portable multimedia player (PMP), and a portable game player.

The memory device 200 may store data to be accessed by the host device.

The memory device 200 may be implemented with a volatile memory device such as a dynamic random access memory (DRAM) and a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The controller 100 may control storage of data in the memory device 200. For example, the controller 100 may control the memory device 200 in response to a request from the host device. The controller 100 may provide the data read from the memory device 200, to the host device, and store the data provided from the host device into the memory device 200.

The controller 100 may include a storage unit 110, a control unit 120, the error correction code (ECC) unit 130, a host interface 140 and a memory interface 150, which are coupled through a bus 160.

The storage unit 110 may serve as a working memory of the memory system 10 and the controller 100, and store data for driving the memory system 10 and the controller 100. When the controller 100 controls operations of the memory device 200, the storage unit 110 may store data used by the controller 100 and the memory device 200 for such operations as read, write, program and erase operations.

The storage unit 110 may be implemented with a volatile memory. The storage unit 110 may be implemented with a static random access memory (SRAM) or a dynamic random access memory (DRAM). As described above, the storage unit 110 may store data used by the host device in the memory device 200 for the read and write operations. To store the data, the storage unit 110 may include a program memory, a data memory, a write buffer, a read buffer, a map buffer, and so forth.

The control unit 120 may control general operations of the memory system 10, and a write operation or a read operation for the memory device 200, in response to a write request or a read request from the host device. The control unit 120 may drive firmware, which is referred to as a flash translation layer (FTL), to control the general operations of the memory system 10. For example, the FTL may perform operations such as logical to physical (L2P) mapping, wear leveling, garbage collection, and bad block handling. The L2P mapping is known as logical block addressing (LBA).

The ECC unit 130 may detect and correct errors in the data read from the memory device 200 during the read operation. The ECC unit 130 may not correct error bits when the number of the error bits is greater than or equal to a threshold number of correctable error bits, and may output an error correction fall signal indicating failure in correcting the error bits.

In some embodiments, the ECC unit 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a Block coded modulation (BCM), and so on. The ECC unit 130 may include all circuits, systems or devices for the error correction operation.

The host interface 140 may communicate with the host device through one or more of various interface protocols such as a universal serial bus (USB), a multi-media card (MMC), a peripheral component interconnect express (PCI-E), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, a column decoder 260, and an input/output circuit 270. The memory cell array 210 may include a plurality of memory blocks 211 and may store data therein. The voltage generation circuit 230, the row decoder 240, the page buffer 250, the column decoder 260 and the input/output circuit 270 form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages having various levels. For example, in an erase operation, the voltage generation circuit 230 may generate operation voltages having various levels such as an erase voltage and a pass voltage.

The row decoder 240 may be connected to the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks among the plurality of memory blocks 211.

The page buffer 250 is connected to the memory cell array 210 through bit lines BL (not shown). The page buffer 250 may precharge the bit lines BL with a positive voltage, transmit/receive data to/from a selected memory block in program and read operations, or temporarily store transmitted data, in response to a page buffer control signal generated by the control circuit 220.

The column decoder 260 may transmit/receive data to/from the page buffer 250 or transmit/receive data to/from the input/output circuit 270.

The input/output circuit 270 may transmit, to the control circuit 220, a command and an address, transmitted from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

Figure 3:
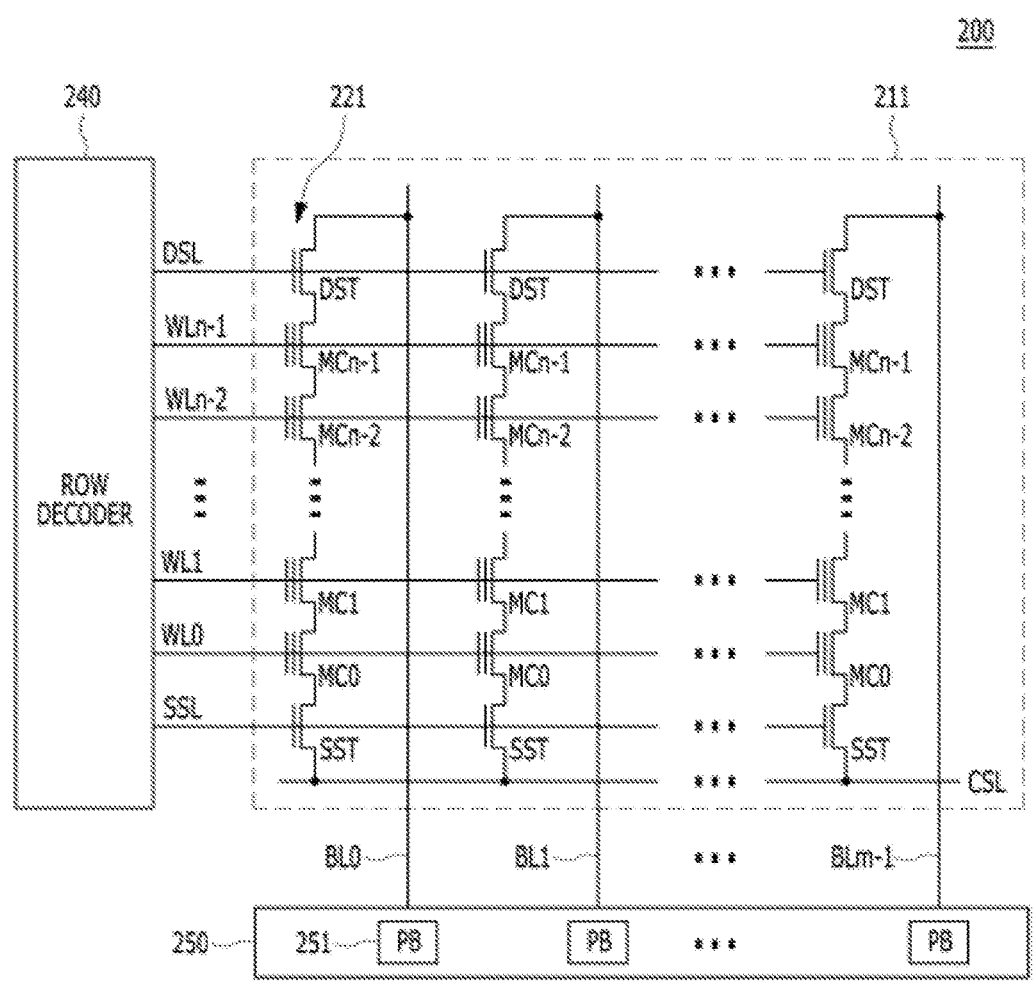
FIG. 3 is a circuit diagram illustrating a memory block of a memory device in accordance with an embodiment of the present invention.

FIG. 3 is a circuit diagram illustrating a memory block of a semiconductor memory device in accordance with an embodiment of the present invention. For example, a memory block of FIG. 3 may be the memory blocks 211 of the memory cell array 200 shown in FIG. 2.

Referring to FIG. 3, the memory blocks 211 may include a plurality of cell strings 221 coupled to bit lines BL0 to BLm−1, respectively. The cell string of each column may include one or more drain selection transistors DST and one or more source selection transistors SST. A plurality of memory cells or memory cell transistors may be serially coupled between the selection transistors DST and SST. Each of the memory cells MC0 to MCn−1 may be formed of a multi-level cell (MLC) storing data information of multiple bits in each cell. The cell strings 221 may be electrically coupled to the corresponding bit lines BL0 to BLm−1, respectively.

In some embodiments, the memory blocks 211 may include a NAND-type flash memory cell. However, the memory blocks 211 are not limited to the NAND flash memory, but may include NOR-type flash memory, hybrid flash memory in which two or more types of memory cells are combined, and one-NAND flash memory in which a controller is embedded inside a memory chip.

Hot and cold data separation is an important feature in solid state drives (SSDs) for lowering write amplification (WA) and increasing drive endurance. By definition, hot data are associated with logical block addresses (LBAs) that are written over frequently, while cold data are associated with LBAs that are rarely written over. If a block only contains hot data, it will likely have more invalid pages after a period of time than a block that contains both hot and cold data. Picking such a block for garbage collection (GC) thus lowers WA and increases the endurance of a drive.

In an example, hot and cold data separation may be done right after receiving data from the host but before the data are ever written to the drive. However, this is hard to achieve in practice because tracking and predicting traffic patterns are difficult tasks. Without prior knowledge of traffic patterns, hot and cold data separation can only be done based on some derived estimates of data temperature after the data have been written to the drive. One common approach is to conduct this operation during GC. If GC victim blocks are chosen correctly, cold data dispersed into multiple blocks when they are first written can be regrouped into a single block to avoid being garbage collected again in the future.

In accordance with aspects of the invention, systems, methods, processes and devices are disclosed herein for choosing GC victim blocks that achieve the effect of hot and cold data separation.

Figure 4:
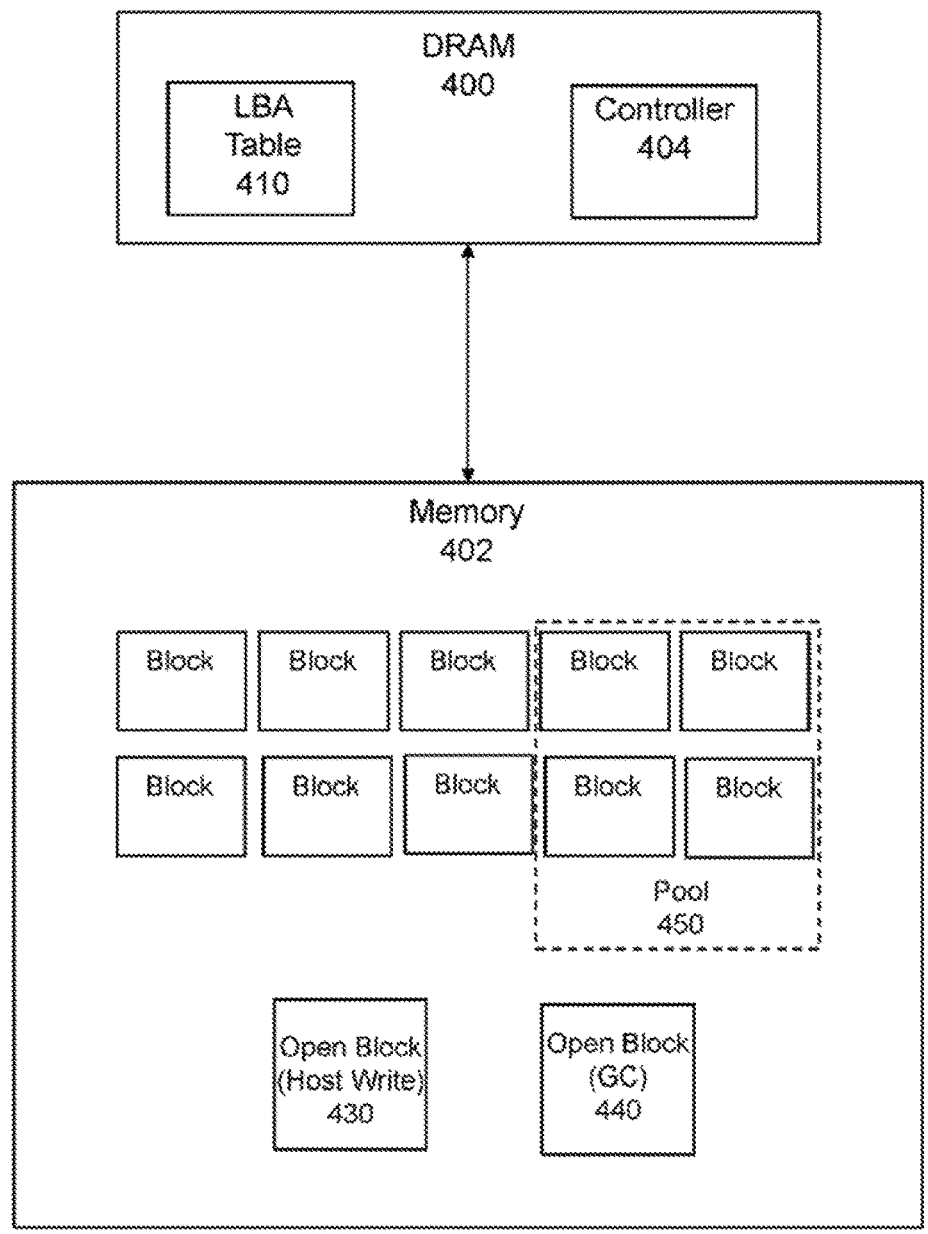
FIG. 4 is a diagram illustrating a memory system according to aspects of the invention.

Referring generally to FIG. 4, an example diagram of a memory system 40 is shown. The memory system 40 includes a DRAM 400 portion and a memory 402 portion. The DRAM may include, among other components, an LBA table 410 and a controller 404 (e.g., controllers described above). The memory 402 may include an open block 430 for host writes and an open block 440 for garbage collection (GC). The memory 402 may also include a plurality of blocks. A portion of the plurality of blocks may be identified and determined to be part of a pool 450 based on criteria as will be described herein.

Figure 5:
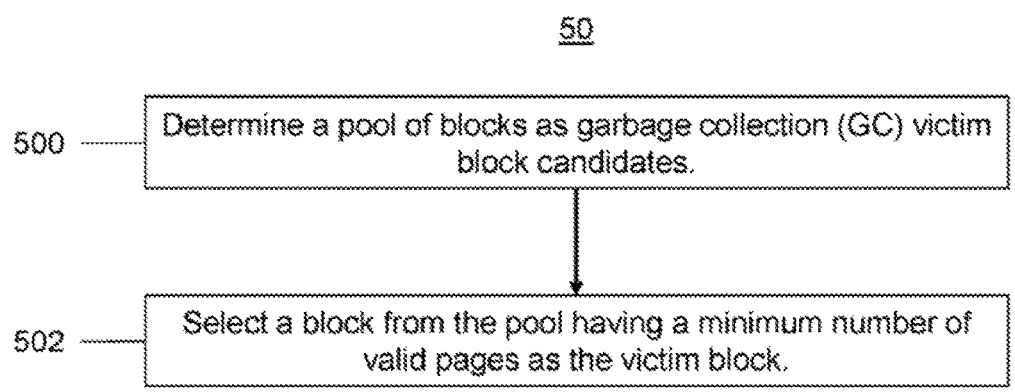
FIG. 5 is a flowchart of steps in a method for garbage collection according to aspects of the invention.

Referring next to FIG. 5, a flowchart 50 of steps for GC is shown. As is generally explained, a "greedy" approach to GC involves selecting the block with a minimum number of valid pages as the GC victim block to achieve the lowest possible WA. However, if the data traffic contains data with different temperatures (e.g., hot data and cold data), the greedy approach will not be optimal.

As used herein, "the minimum number of valid pages" may be predetermined. It may represent the least number of valid pages among the blocks of the memory 402, or a minimum number at which a block should be considered for GC. Minimum numbers other than those described will be apparent to those of skill in the art from the disclosure herein.

At step 500, a pool of blocks (e.g., pool 450) is determined from the plurality of blocks in the memory 402 as garbage collection victim block candidates. For traffic with hot and cold data, it is likely that the block with the minimum number of valid pages when GC is triggered is a recently written block that contains mostly hot data. If this block is not garbage collected and remains in the drive for a longer period of time, more of its hot data may become invalidated so even fewer valid pages are left when GC is triggered next time, and these remaining pages are more likely to be cold data. In other words, by restricting the candidates of GC victim blocks to the pool of oldest blocks in the drive, the probability of garbage collecting cold data is increased, which means that cold data will have a higher chance of being grouped together in the GC destination blocks, thus achieving the effect of hot and cold data separation. The restriction of the GC victim block candidates as described above may be done by "age" (e.g., the amount of time the block has gone without being GCed before), but other criteria may be utilized as well, such as number of valid pages, criteria met by metadata, etc.

At step 502, a block from the pool having a minimum number of valid pages is selected as the victim block. The size of the pool of blocks may change (e.g., may depend on) according to the traffic pattern and over-provisioning (OP) value. Without adaptation, however, a simple, suboptimum strategy is to optimize the size of the pool for the most relevant traffic pattern and OP value and then fix it over all other traffic patterns and OP values. The resultant WA values will be higher for the latter cases, but will still be better than the WA values of the greedy approach. In fact, as long as the size of the pool is not exceedingly small (e.g., the size of the pool is at least about 5% of all the blocks in the drive), the selection method disclosed herein and the greedy approach will give identical WA values for the pure random write traffic, since the block with the minimum number of valid pages is always one of the oldest blocks in the drive for this traffic. This is a major advantage over some existing GC victim selection methods, where the WA values are worse than those of the greedy approach in the pure random write traffic and in traffic with a large footprint of hot data (e.g., the hot data covers a large LBA range) despite the fact that a large gain is attained if the footprint of the hot data is small.

Figure 6:
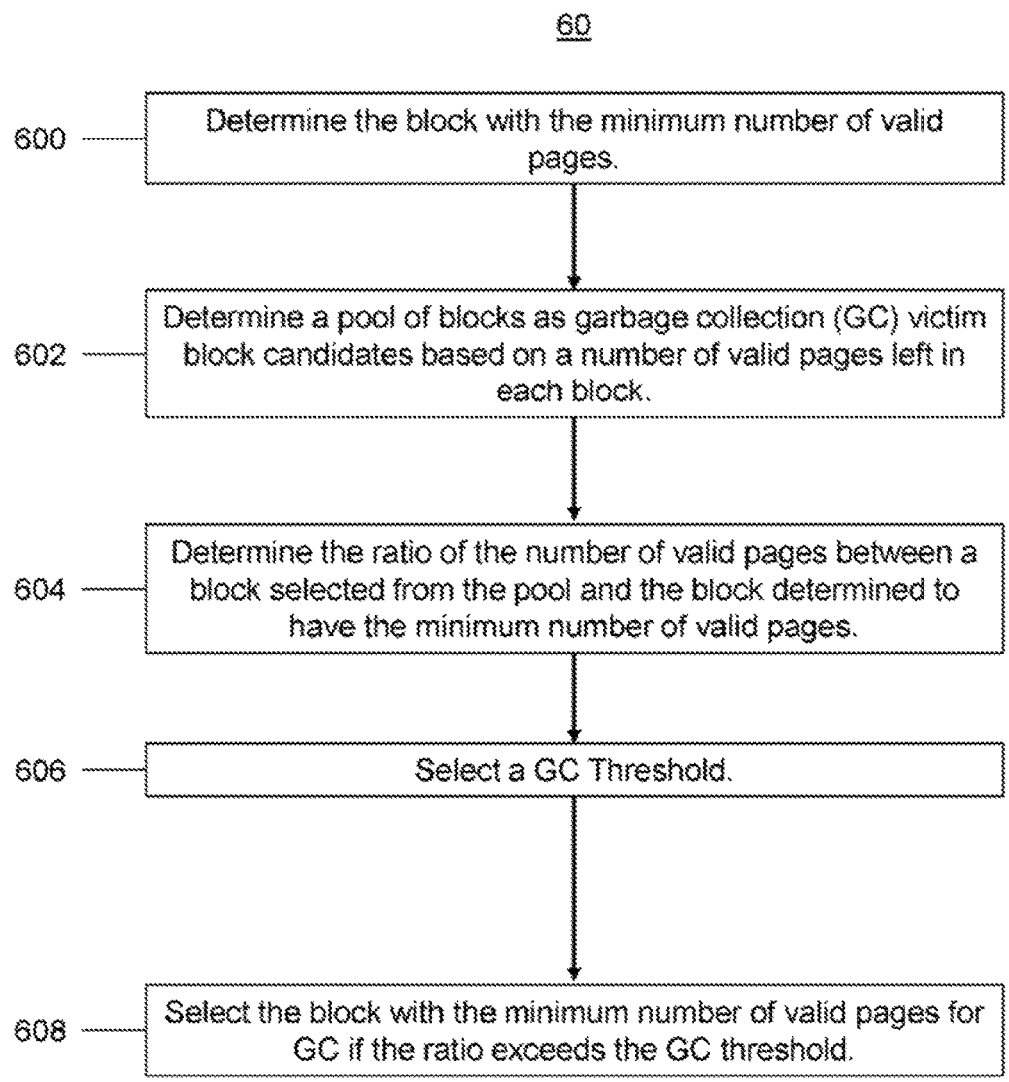
FIG. 6 is a flowchart of steps in a method for garbage collection according to aspects of the invention.

Referring next to FIG. 6, a flowchart 60 of steps in a hybrid approach to GC is shown. At step 600, the block with the minimum number of valid pages is determined (e.g., greedy approach). At step 602, a pool of blocks as GC victim block candidates is determined based on a number of valid pages in each block of the memory 402. At step 604, the ratio of the number of valid pages between a block selected from the pool and the block determined to have the minimum number of valid pages (step 600) is determined. At step 606, a GC threshold is selected. At step 608, the block with the minimum number of valid pages is selected for GC if the ratio exceeds the GC threshold.

In some cases, the GC victim block selected by the greedy approach may only have a small number of valid pages left. As such, garbage collecting this block at a later time may not offer much gain, especially if the block selected from the pool of oldest blocks has a relatively large number of valid pages. More specifically, if the ratio of the number of valid pages between the block selected from the pool of oldest blocks and the block selected by the greedy approach exceeds a certain GC threshold, it is better to choose the one selected by the greedy approach as the GC victim block, since the future reduction in the number of valid pages by delaying GC of this block may not sufficiently compensate for the current penalty of having to garbage collect more pages in the block selected from the pool of oldest blocks. This hybrid approach of dynamically selecting GC victim blocks can help to lower WA further.

The GC threshold may be a function of the traffic pattern and OP value, as well as the size of the pool of oldest blocks. It can again be optimized for a specific set of parameter values and then fixed for use in other cases. If the GC threshold is set to 1, the hybrid approach will revert to the greedy method, while if the GC threshold is set to a sufficiently large value, it will always select from the pool of oldest blocks. Moreover, this hybrid approach will achieve the same WA as the greedy method for pure random write traffic regardless of the value of the threshold, as long as the size of the pool of oldest blocks is not too small.

An example algorithm for selecting GC victim block according to the disclosure herein is described below. The algorithm is exemplary and not exclusive. Those of skill in the art will understand other suitable algorithms and variations for effectuating the invention from the disclosure herein.

(1) From all the closed blocks in the drive, find the one with the minimum number of valid pages. Denote this block as blk_min_overall and the corresponding number of valid pages as num_page_min_overall.

(2) From the M oldest closed blocks in the drive, find the one with the minimum number of valid pages. Denote this block as blk_min_oldest_M and the corresponding number of valid pages as num_page_min_oldest_M.

(3) If num_page_min_oldest_M≤k×num_page_min_overall, where k≥1 is a threshold, select blk_min_oldest_M as the GC victim block. Otherwise, select blk_min_overall as the GC victim block.

As described above, k represents the GC threshold. Implementation of this algorithm is straightforward, which is another key advantage over other GC victim block selection methods. The two potential victim blocks blk_min_overall and blk_min_oldest_M can be found with a single parse of the list of closed blocks. Also, the decision to select the final victim block can be coded with a simple if-else statement. Hence, the run time of this algorithm is expected to be only slightly higher than that of the greedy approach.

Figure 7:
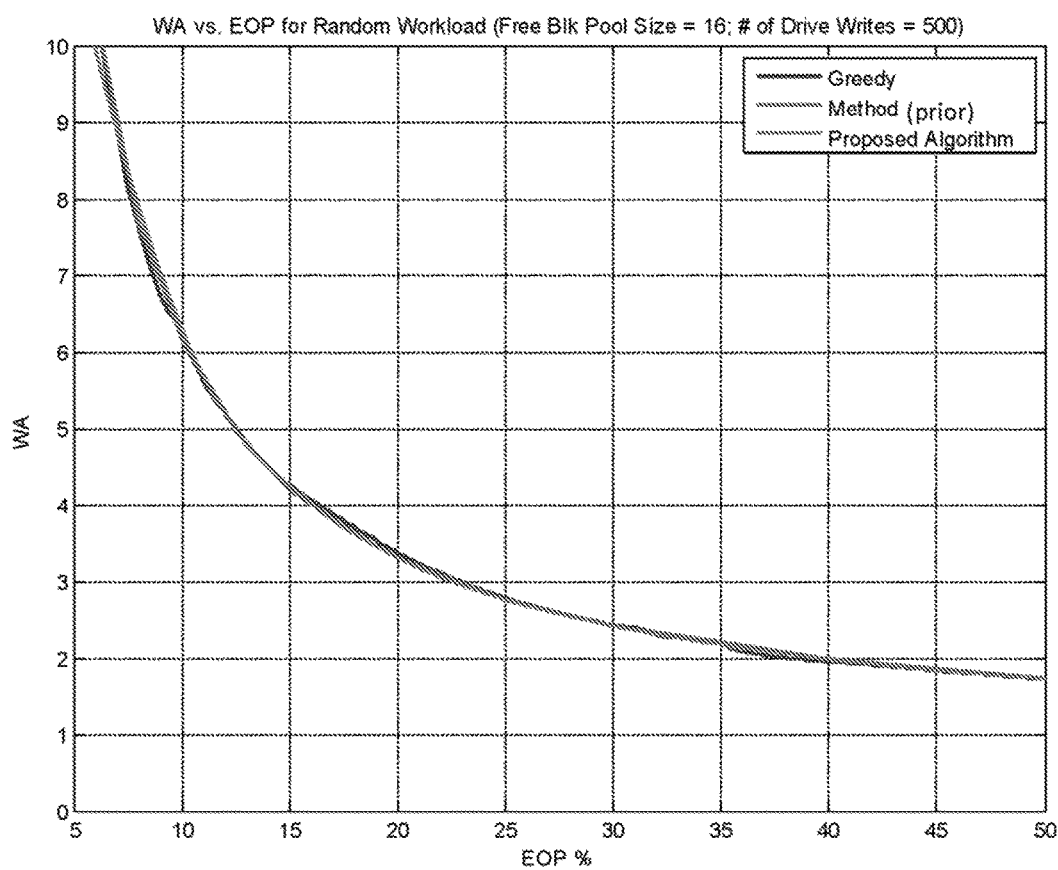
FIGS. 7, 8, and 9 are graphs depicting performance data in accordance with aspects of the invention.
Figure 8:
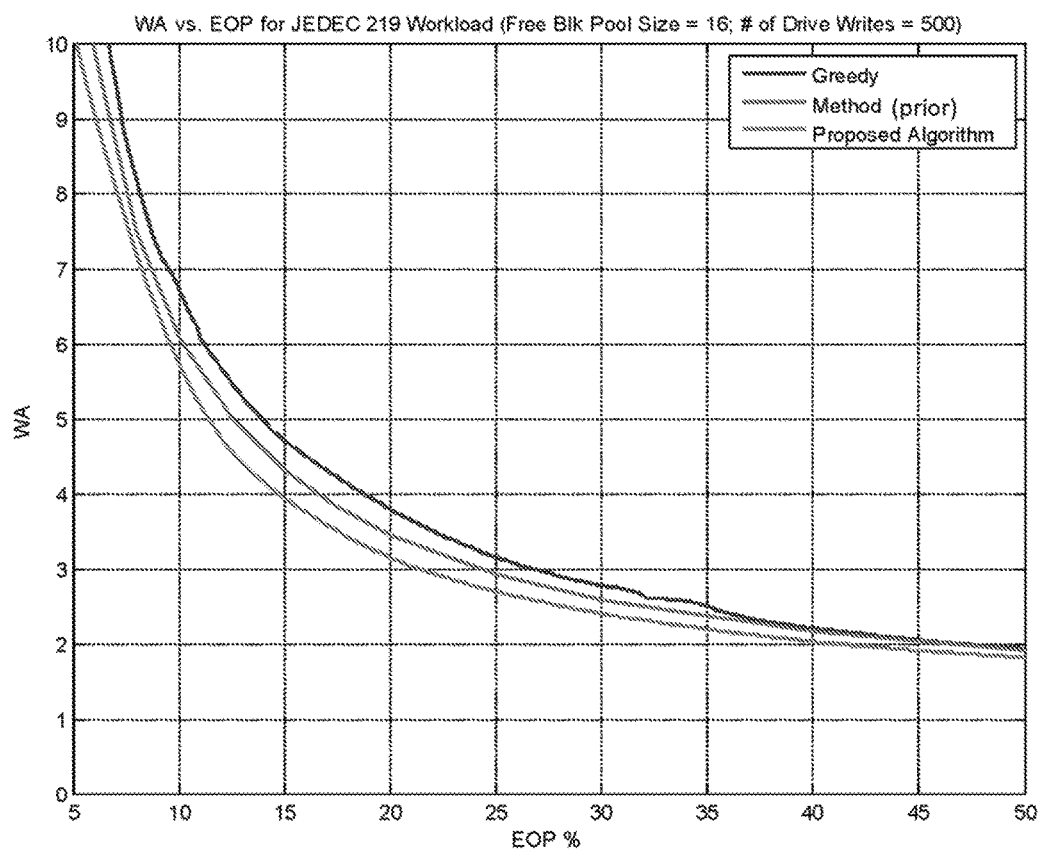
Figure 9:
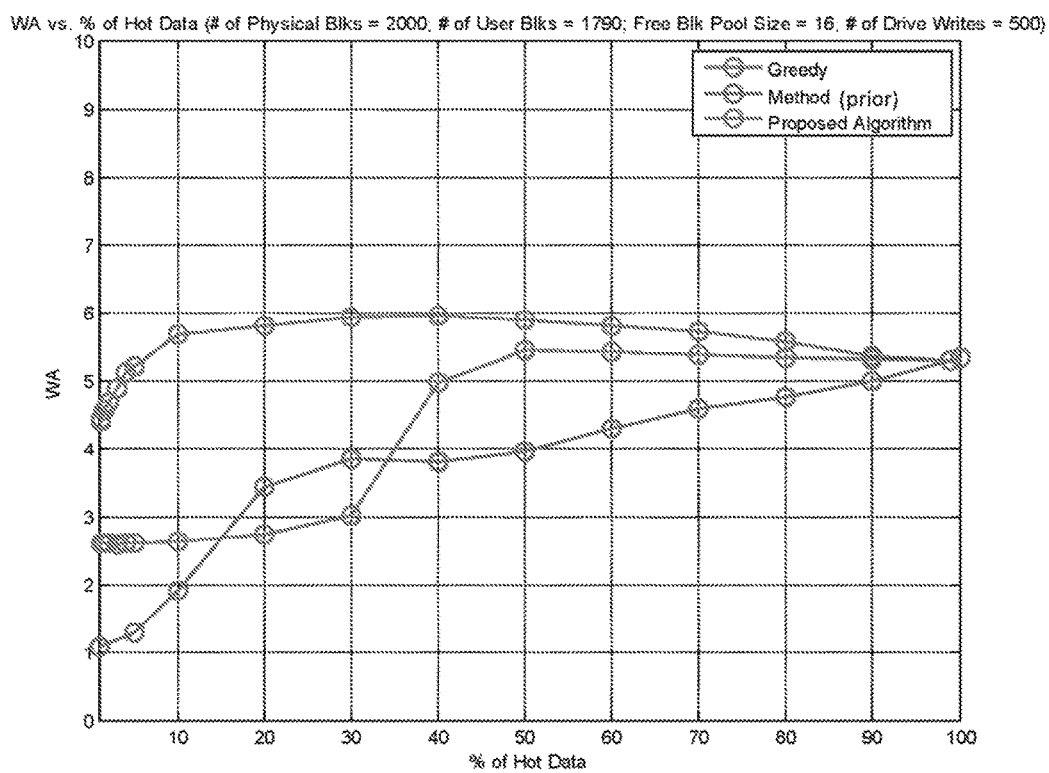

FIGS. 7, 8, and 9 show graphs 70, 80 and 90 of simulation results in accordance with the systems, methods, processes and devices described above. The algorithm was tested with the following parameters: number of user blocks=1790; number of blocks in free block pool=16; OP value 11.73%, M=1000, k=1.4.

FIG. 7 shows a graph 70 depicting the relationship between WA and OP for the pure random write traffic. The WA is the cumulative WA measured after 500 drive writes. FIG. 7 confirms the fact that the greedy approach and the proposed algorithm are identical for the pure random write traffic if M is not too small. For the purpose of comparison, a method that selects GC victim blocks by dynamically switching between the algorithm based on a known method and the greedy method, as in the hybrid approach disclosed herein, is also included. This method achieves the same WA values as the other two methods for the pure random write traffic.

FIG. 8 is a graph 80 depicting the relationship between WA and OP. The algorithms disclosure herein achieve a gain over both the greedy approach and a previously known method for OP values ranging from 5% to 50%.

FIG. 9 is a graph 90 showing the relationship between WA and the percentage of hot data in a traffic pattern for a fixed OP value of 11.73%. The percentage of hot data in a traffic pattern is defined as the percentage of the overall LBA range hot data occupy. In the traffic patterns, only LBAs corresponding to hot data are repeatedly overwritten, while LBAs corresponding to cold data are not written again after pre-conditioning.

FIG. 9 shows that from 1% to 30% of hot data, the proposed algorithm achieves much better WA values than the greedy method, but the gains narrow as the percentage of hot data continues to increase, eventually converging to the same WA values as the greedy method. Also, for most of the data points shown, the WA values of the disclosed algorithm are higher. If the parameters of the disclosed algorithm are optimized for each traffic pattern, lower WA values can be obtained Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   determining, with a controller, a pool of blocks from a plurality of blocks of a memory as garbage collection (GC) victim block candidates, the pool of blocks representing a select number of the oldest closed blocks, based on a number of valid pages left in each of the plurality of blocks;
   selecting, with the controller, from the pool of blocks, a block having a minimum number of valid pages as a pool victim block, which is a candidate for garbage collection;
   selecting, from all closed blocks, a block having the minimum number of valid pages as an overall victim block, which is a candidate for garbage collection;
   determining a ratio of a number of valid pages in the pool victim block and a number of valid pages in the overall victim block; and
   selecting a final victim block from the pool victim block and the overall victim block according to at least the ratio.

2. The method of claim 1, wherein the pool of blocks has a size based on traffic patterns of hot and cold data and an over-provisioning value of the memory.

3. The method of claim 1, wherein the pool victim block is selected as the block from the pool of blocks with the least number of valid pages.

4. The method of claim 1, wherein the pool of blocks has a size that is at least about 5% of the plurality of blocks.

5. The method of claim 1, wherein the overall victim block is selected from all of the closed blocks as the block with the least number of valid pages.

6. The method of claim 5, wherein the ratio represents a GC threshold.

7. The method of claim 6, wherein the GC threshold is a function of traffic patterns of hot and cold data, an over-provisioning value, and a size of the pool of blocks.

8. A memory device, comprising:
   a plurality of blocks;
   a pool of blocks from the plurality of blocks determined as garbage collection (GC) victim block candidates, the pool of blocks representing a select number of the oldest closed blocks, based on a number of valid pages left in each of the plurality of blocks;
   a pool victim block selected, from the pool of blocks, as a block having a minimum number of valid pages, and which is a candidate for GC;
   an overall victim block selected, from all closed blocks, as a block having the minimum number of valid pages, and which is a candidate for GC;
   a ratio determined as of a number of valid pages in the pool victim block and a number of valid pages in the overall victim block; and
   a final victim block selected from the pool victim block and the overall victim block according to at least the ratio.

9. The memory device of claim 8, wherein the pool of blocks has a size based on traffic patterns of hot and cold data and an over-provisioning value of the memory device.

10. The memory device of claim 8, wherein the pool victim block is selected as the block from the pool of blocks with the least number of valid pages.

11. The memory device of claim 8, wherein the pool of blocks has a size that is at least about 5% of the plurality of blocks.

12. The memory device of claim 8, wherein the overall victim block is selected from all of the closed blocks as the block with the least number of valid pages.

13. A memory system, comprising:
   a memory including a plurality of blocks; and
   a controller suitable for:
      determining a pool of blocks from the plurality of blocks as garbage collection (GC) victim block candidates, the pool of blocks representing a select number of the oldest closed blocks, based on a number of valid pages left in each of the plurality of blocks, and selecting, from the pool of blocks, a block having a minimum number of valid pages as a pool victim block, which is a candidate for garbage collection,
      selecting, from all closed blocks, a block having the minimum number of valid pages as an overall victim block, which is a candidate for garbage collection,
      determining a ratio of a number of valid pages in the pool victim block and to a number of valid pages in the overall victim block, and
      selecting a final victim block from the pool victim block and the overall victim block according to at least the ratio.

14. The memory system of claim 13, wherein the pool of blocks has a size based on traffic patterns of hot and cold data and an over-provisioning value of the memory system.

15. The memory system of claim 13, wherein the pool victim block is selected as the block from the pool of blocks with the least number of valid pages.

16. The memory system of claim 13, wherein the pool of blocks has a size that is at least about 5% of the plurality of blocks.

17. The memory system of claim 13, wherein the overall victim block is selected from all of the closed blocks as the block with the least number of valid pages.

18. The memory system of claim 17, wherein the ratio represents a GC threshold.

19. The memory system of claim 18, wherein the GC threshold is a function of traffic patterns of hot and cold data, an over-provisioning value, and a size of the pool of blocks.

* * * * *